Figure 1:
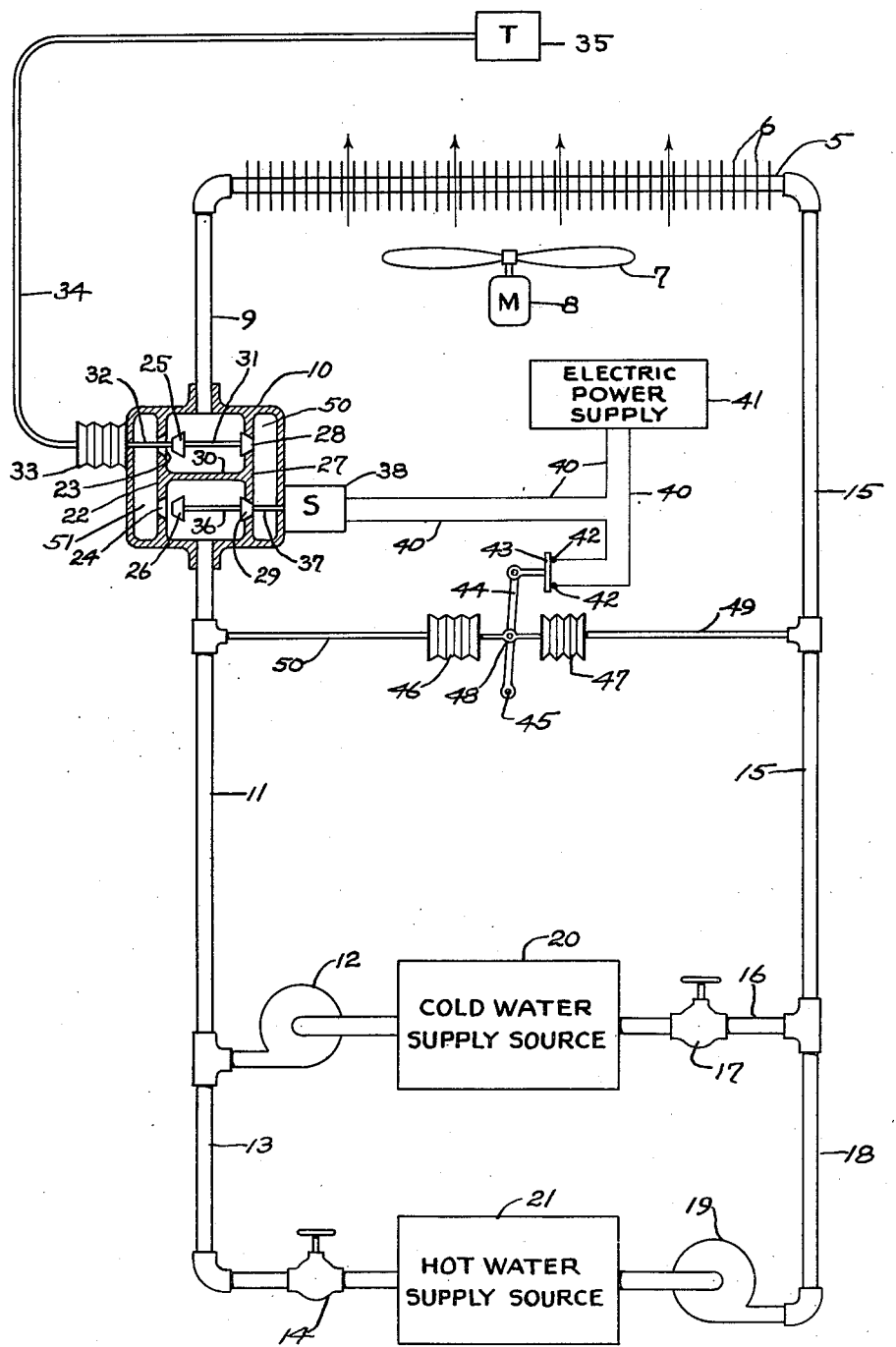

June 3, 1952  R. D. HEITCHUE  2,599,175
TEMPERATURE CONTROL VALVE
Filed June 28, 1947  2 SHEETS—SHEET 1

INVENTOR
REGIS D. HEITCHUE
BY Robert J. Palmer
Attorney

Patented June 3, 1952

2,599,175

UNITED STATES PATENT OFFICE 2,599,175

TEMPERATURE CONTROL VALVE

Regis D. Heitchue, Cranford, N. J., assignor to Westinghouse Electric Corporation, East Pittsburgh, Pa., a corporation of Pennsylvania Application June 28, 1947, Serial No. 757,889

2 Claims. (Cl. 236—1)

This invention relates to air conditioning systems, and relates more particularly to air conditioning systems having local heat exchangers in a plurality of rooms.

In air conditioning systems such, for example, as those for the rooms of hotels and office buildings, it is the practice to circulate cooling fluids through heat exchangers in the rooms in the cooling seasons, and to circulate heating fluids through the same heat exchangers in the heating seasons. It is desirable to have a simple thermostatic control for each room for regulating the temperature therein for both cooling and heating, but the ordinary thermostatic control is not suitable for the reason it would function, if designed for use in the heating season, to open a valve admitting heating fluid to the heat exchanger upon a fall in room temperature, and would therefore open the same valve upon a fall in room temperature in the cooling season, at which time it should close the valve. Likewise an ordinary thermostatic control designed for use in the cooling season, would act to close a valve admitting fluid to a heat exchanger upon a fall in room temperature, which would prevent the same control from being used in the heating season.

This invention provides an air conditioning system in which a cooling fluid is circulated in one direction through a heat exchanger in the cooling season, and a heating fluid is circulated in the opposite direction through the heat exchanger in the heating season, and a control responsive to the change in direction of the flow of the fluids, actuates a thermostatic control for causing it to admit more or less cooling fluid into a heat exchanger upon a rise or a fall respectively, in room temperature during the cooling season, and for causing it to admit less or more heating fluid into the heat exchanger upon a rise or fall respectively, in room temperature during the heating season.

An object of the invention is to provide a year-around air conditioning system in which a single thermostatic control automatically regulates the flow of a cooling fluid or a heating fluid through a local heat exchanger.

Figure 2:
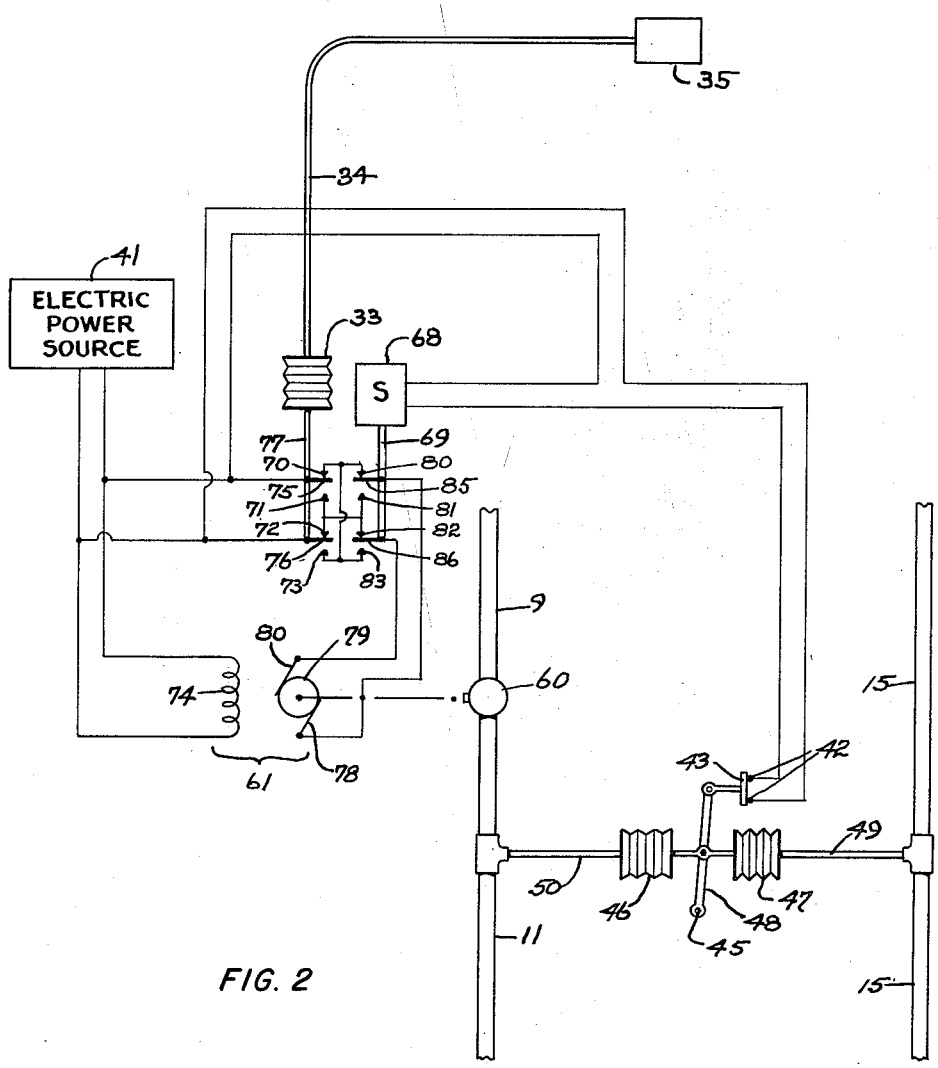

The invention will now be described with reference to the drawing, of which:

Fig. 1 is a diagrammatic view illustrating an air conditioning system embodying this invention, and Fig. 2 is a diagrammatic view illustrating controls for another form of valve which may be used in the system of Fig. 1.

The heat exchange tube 5 with the extended surface fins 6 thereon, and the associated fan 7 driven by the electric motor 8, comprises an air conditioning unit from which cold air can be blown into a room in which the unit is located, in the cooling season, and from which heated air can be blown into the room in the heating season.

One end of the tube 5 is connected by the pipe 9 to the valve 10 which is connected by the pipe 11 to the outlet of the pump 12, and by the pipes 11 and 13 to the valve 14. The other end of the tube 5 is connected by the pipes 15 and 16 to the valve 17, and by the pipes 15 and 18 to the outlet of the pump 19.

The cold water supply source 20 is connected to the inlet of the pump 12, and to the valve 17. The hot water supply source 21 is connected to the inlet of the pump 19, and to the valve 14.

The valve 10 has the inner wall 22 with the ports 23 and 24 for the poppet valve members 25 and 26 respectively, formed therein, and has the inner wall 27 extending parallel to the wall 22 and spaced therefrom. The wall 27 has ports for the poppet valve members 28 and 29 formed therein. The wall 30 extends between the walls 22 and 27.

The poppet valve members 25 and 28 are interconnected by the valve stem 31, and are connected to the plunger 32 of the bellows 33. The bellows 33 is connected by the tube 34 to a conventional room thermostat 35. The thermostat, the bellows and the tube 34 form a conventional hydraulic control containing a suitable hydraulic fluid whereby upon a rise in room temperature, the bellows 33 will be expanded, and upon a fall in room temperature, the bellows will be contracted.

The poppet valve members 26 and 29 are interconnected by the valve stem 36, and are connected to the plunger 37 of the solenoid 38. The energizing winding of the solenoid is connnected by the wires 40 to the electric power supply source 41 and to the contacts 42. The contacts 42 are adapted to be bridged across by the switch 43 for energizing the solenoid.

The switch 43 is connected to one end of the arm 44, the other end of which is pivoted at 45. The arm 44 is connected intermediate its ends to the plunger 48 extending between the bellows 46 and the bellows 47. The bellows 46 is connected by the tube 50 to the pipe 11, and the bellows 47 is connected by the tube 49 to the pipe 15. Flow through the pipe 15 of hot water from the source 21 to the heat exchange tube 5, and the return of the water through the pipe 11, will cause the bellows 47 to expand and the bellows 46 to contract, thereby causing the arm 44 to move the switch 43 away from the contacts 42 thereby deenergizing the solenoid 38. Flow of cold water from the source 20 in the opposite direction will cause the bellows 47 to contract, and the bellows 46 to expand, thereby causing the arm 44 to move the switch 43 against the contacts 42, thereby energizing the solenoid.

In the operation of the embodiment of the invention illustrated by Fig. 1, assuming it is the heating season, the valve 17 would be closed, the valve 14 would be opened, the pump 12 would be inoperative, and the pump 19 would be operated. This would result in hot water from the source 21 being pumped through the pipe 15 to the heat exchange tube 5, the water being returned through the pipes 9 and 11 for recirculation through the source 21. The difference in pressure between the pipes 11 and 15 will be communicated through the tubes 50 and 49 to the bellows 46 and 47 causing the bellows 47 to expand, and the bellows 46 to contract this will cause the arm 44 to move the switch 43 away from the contacts 42 thereby deenergizing the solenoid 38.

Upon deenergization of the solenoid, it will release its plunger 37 thereby moving the poppet valve member 29 out of its port in the wall 27, and moving the poppet valve member 26 into its port 24. This will close the passage 51 in the valve 10, and open the passage 50 therein. The flow of hot water from the pipe 9 will therefore be through the valve port of the poppet valve member 28 into the passage 50, and then through the port of the poppet valve member 29 into the pipe 11, it being assumed that the thermostat 35 has not acted to close the port of the poppet valve member 28.

Upon a rise in room temperature, the room thermostat will cause the bellows 33 to expand and to move the poppet valve member 28 into its port thereby closing the passage 50, and discontinuing the flow of hot water through the tube 5.

The heat exchange tube 5 would be but one of a number served by the pumps 19 and 12, and the pumps could be equipped with a conventional pressurestat for shutting down the pump in operation when all of the fluid flow valves are closed.

Upon a fall in room temperature, the thermostat 35 would cause the bellows 33 to contract and to move the poppet valve member 28 of its port thereby opening the valve 10 to the flow of the hot water.

Upon the start of the cooling season, the valve 14 would be closed, the valve 17 would be opened, the pump 19 would be inoperative, and the pump 12 would be operated. Thereupon the pump 12 would supply chilled water through the pipes 11 and 9 to the heat exchange tube 5, the water being returned through the pipe 15 for recirculation through the source 20. The difference in pressure between the pipes 11 and 15 which would be communicated through the tubes 50 and 49 to the bellows 46 and 47 respectively, would then cause the bellows 46 to expand and the bellows 47 to contract. This would result in the arm 44 moving the switch 43 against the contacts 42 thereby energizing the solenoid 38 and causing it to retract its plunger 37 and through same to move the poppet valve member 26 out its port 24, and the poppet valve member 29 into its port. This would result in the valve passage 51 being opened, and the passage 50 being closed. The flow of cold water would then be from the pipe 11 into the passage 51, and then through the port 23 into the pipe 9.

Then upon a rise in room temperature, the thermostat 35 would cause the bellows 33 to expand and move the poppet valve member 25 out of its port 23, the greater movement providing a great volume of water through the heat exchange tube 5. Upon a fall in room temperature, the bellows 33 would be contracted and would move the poppet valve member 25 into its port 23 thereby decreasing the volume of cold water or cutting it off altogether depending upon the degree of temperature reduction.

In the embodiment of the invention illustrated by Fig. 2, the valve 60 controls the admission of heat exchange fluid into the heat exchange tube, and is opened and closed by the electric motor 61 which is energized from the electric source 41. The direction of rotation of the motor 61 is controlled by switching mechanism operated by the thermostat 35 and by the solenoid 68 which is energized when the switch 43 is moved against the contacts 42.

The solenoid 68 has a plunger 69 to which are insulatedly attached the contact arms 85 and 86 which are connected to the brushes 78 and 80 respectively, of the armature 79 of the motor 61. The field winding 74 of the motor is connected to the power source 41 and to the switch arms 75 and 76 which are insulatedly attached to the plunger 77 of the bellows 33. The contact 70 for the contact arm 75, and the contact 80 for the contact arm 85 are connected together and to the contact 73 for the contact arm 76, and to the contact 83 for the contact arm 86. The contact 71 for the contact arm 75, and the contact 81 for the contact arm 85 are connected together and to the contact 72 for the contact arm 76, and to the contact 82 for the contact arm 86.

When the solenoid 68 is energized, its plunger 69 is drawn in causing the contact arms 85 and 86 to be spaced from the contacts 81 and 83 respectively, and to touch the contacts 80 and 82 respectively. When the solenoid is deenergized, its spring biased plunger 69 will be released, causing the contact arms 85 and 86 to leave the contacts 80 and 82 respectively, and to touch the contacts 81 and 83 respectively.

When the bellows 33 is contracted, its plunger 77 will be moved inwardly causing the contact arms 75 and 76 to be spaced from the contacts 71 and 73 respectively, and to touch the contacts 70 and 72 respectively. When the bellows is expanded its plunger is moved to cause the contact arms 75 and 76 to leave the contacts 70 and 72 respectively, and to touch the contacts 71 and 73 respectively.

The switch arms 75 and 76 and their associated contacts 70, 73, 71 and 72 form one double pole, double throw switch, and the switch arms 85 and 86 and their associated contacts 80, 83, 81 and 82 form another double pole, double throw switch for controlling the direction of rotation of the motor 61 by varying the direction of connection of its armature to its field winding in conventional motor reversing circuits.

When cold water is supplied through the pipes 9 and 11, and returned through the pipe 15, the bellows 46 will expand, and the bellows 47 will contract causing the switch 43 to move against the contacts 42 thereby energizing the solenoid 68 which will pull in its plunger 69 to the position shown by Fig. 2 of the drawing. Then if the temperature at the thermostat 35 is such that cooling is not required, the bellows 33 will be contracted and its plunger 77 will be in the position illustrated by Fig. 2, with the contact arms 85 and 86 in contact with the contacts 80 and 82 respectively, causing the motor to rotate in a direction to close the valve 60. A conventional limit switch which is not illustrated, would stop the motor when the valve was fully closed.

Then if the temperature increases until the thermostat calls for cooling, the bellows 33 will expand and move its plunger 77 outwardly causing the contact arms 75 and 76 to leave the contacts 70 and 72 respectively, and to touch the contacts 71 and 73 respectively, causing the motor to rotate in the reverse direction to open the valve 60, a conventional limit switch stopping the motor when the valve is fully open.

When hot water is supplied through the pipe 15 and returned through the pipes 9 and 11, the bellows 46 and 47 will act to move the switch 43 away from the contacts 42 thereby deenergizing the solenoid 68 which will release its plunger 69 which will move the contact arms 85 and 86 away from the contacts 80 and 82 respectively, and against the contacts 81 and 83 respectively. Then if the thermostat calls for heat, the bellows 33 will contract causing the plunger 77 to move the contact arms 75 and 76 against the contacts 70 and 72 respectively, causing the motor 61 to rotate in a direction to open the valve 60.

Then when the thermostat 35 is satisfied, the switch arms 75 and 76 will be moved by expansion of the bellows 33, away from the contacts 70 and 72, stopping the motor and the further opening of the valve if the limit switch has not acted. If the temperature continues to rise, the bellows 33 will expand causing the switch arms 75 and 76 to touch the contacts 71 and 73 respectively, and causing the motor 61 to rotate in a direction to close the valve.

The cold water supply source 20 could contain refrigerant evaporator tubes supplied with a volatile refrigerant from a conventional condensing unit, or could be a source of water chilled by ice.

The hot water supply source 21 could be heated by steam or by any other conventional source of heat.

While embodiments of the invention have been described for the purpose of illustration, it should be understood that the invention is not limited to the exact apparatus and arrangements of apparatus illustrated, as modifications thereof may be suggested by those skilled in the art, without departure from the essence of the invention.

What is claimed is:

1. An air conditioning system comprising a heat exchange tube, valve means connected to the tube for controlling the passage of heat exchange fluid therethrough, said valve means having first and second passages therethrough, spaced apart first and second movable means for opening and closing said passages, means including piping connected to said tube and valve means for circulating a heating fluid in one direction therethrough and for circulating a cooling fluid in the opposite direction therethrough, means responsive to changes in the direction of flow of fluid through said piping for moving said first movable means in one direction for opening said first passage and for closing said second passage when heating fluid is circulated through the piping, and for moving said first movable means in the opposite direction for closing said first passage and for opening said second passage when cooling fluid is circulated through the piping, a thermostat in the conditioned space, and means actuated by said thermostat for moving said second movable means in one direction for opening said first passage and for closing said second passage upon a fall in the temperature of the conditioned space, and for moving said second movable means in a direction opposite to the last mentioned direction for closing said first passage and for opening said second passage upon a rise in the temperature of the conditioned space.

2. An air conditioning system comprising a heat exchange tube, valve means connected to the tube for controlling the passage of fluid therethrough, a motor rotatable in one direction to open said valve means, and rotatable in the opposite direction to close said valve means, piping connected to said valve and tube, means for circulating a cooling fluid in one direction through said piping and tube, means for circulating a heating fluid in the opposite direction through said piping and tube, a thermostat in the conditioned space, and means including said thermostat and including means responsive to changes in the direction of fluid flow through said piping for causing said motor to rotate to close said valve means when heating fluid is circulated through said piping and the temperature in the conditioned space rises above a predetermined temperature, and for causing said motor to rotate to open said valve means when cooling fluid is circulated through said piping and the temperature in the conditioned space rises above said temperature.

REGIS D. HEITCHUE.

REFERENCES CITED

The following references are of record in the file of this patent:

UNITED STATES PATENTS

| Number | Name | Date |
| --- | --- | --- |
| Re. 22,685 | Carrier | Oct. 30, 1945 |
| 2,121,625 | Crago | June 21, 1938 |